United States Patent
Bauch

(10) Patent No.: US 11,584,654 B2
(45) Date of Patent: Feb. 21, 2023

(54) METHOD FOR INCREASING THE PURITY OF OLIGOSILANES AND OLIGOSILANE COMPOUNDS BY MEANS OF FRACTIONAL CRYSTALLIZATION

(71) Applicant: PSC POLYSILANE CHEMISTRY GMBH, Bitterfeld-Wolfen (DE)

(72) Inventor: Christian Bauch, Muldestausee (DE)

(73) Assignee: PSC Polysilane Chemistry GmbH, Bitterfeld-Wolfen (DE)

( * ) Notice: Subject to any disclaimer, the term of this patent is extended or adjusted under 35 U.S.C. 154(b) by 839 days.

(21) Appl. No.: 16/469,975

(22) PCT Filed: Dec. 15, 2017

(86) PCT No.: PCT/DE2017/000425
§ 371 (c)(1),
(2) Date: Jun. 14, 2019

(87) PCT Pub. No.: WO2018/108199
PCT Pub. Date: Jun. 21, 2018

(65) Prior Publication Data
US 2020/0079653 A1 Mar. 12, 2020

(30) Foreign Application Priority Data
Dec. 15, 2016 (DE) .......................... 102016014900.0

(51) Int. Cl.
*C01B 33/107* (2006.01)
*B01D 9/00* (2006.01)
(52) U.S. Cl.
CPC ...... *C01B 33/10778* (2013.01); *B01D 9/0004* (2013.01); *B01D 9/0036* (2013.01); *B01D 2009/0086* (2013.01)

(58) Field of Classification Search
CPC .......... B01D 2009/0086; B01D 9/0004; B01D 9/0036; C01B 33/107; C01B 33/10778
See application file for complete search history.

(56) References Cited

U.S. PATENT DOCUMENTS 4,698,432 A * 10/1987 Verga .................. C07D 263/57
548/224
2009/0169457 A1 * 7/2009 Auner .................. C08G 77/60
423/342

(Continued)

FOREIGN PATENT DOCUMENTS

DE 10 2009 027 729 A1 1/2011
DE 10 2014 007 685 A1 11/2015

(Continued)

OTHER PUBLICATIONS

SoliQz, "Crystallization", 5 pages, taken from https://web.archive.org/web/20171113092449/https://www.soliqz.com/crystallization/types-of-crystallization/ (Year: 2017).*

(Continued)

*Primary Examiner* — Ngoc-Yen Nguyen
(74) *Attorney, Agent, or Firm* — Smartpat PLC

(57) ABSTRACT

The invention relates to a method for increasing the purity of oligosilanes and/or oligosilane compounds, in which a first liquid substance mixture formed from at least 50% oligosilane compounds comprising inorganic oligosilanes and/or halogenated oligosilanes and/or organically substituted oligosilanes is provided, and the first liquid substance mixture is subjected to at least one purification sequence, wherein in a first step a) the liquid substance mixture is temperature adjusted to a temperature at which at least one fraction of the oligosilane compounds solidify, and in a second step b) at least one fraction of the liquid substance mixture is separated.

5 Claims, 1 Drawing Sheet

(56) References Cited

U.S. PATENT DOCUMENTS

| | | | |
|---|---|---|---|
| 2015/0098890 A1* | 4/2015 | Jung | B01D 53/1425 252/190 |
| 2016/0264426 A1 | 9/2016 | Kerrigan et al. | |
| 2017/0247260 A1 | 8/2017 | Bauch et al. | |
| 2020/0079653 A1 | 3/2020 | Bauch | |

FOREIGN PATENT DOCUMENTS

| | | |
|---|---|---|
| DE | 10 2014 013 250 A1 | 3/2016 |
| JP | 2006169012 A | 6/2006 |
| JP | 2013212957 A | 10/2013 |
| WO | 2016037601 A1 | 3/2016 |

OTHER PUBLICATIONS

Wikipedia: "Fractional crystallization (chemistry)", Sep. 26, 2016 (Sep. 26, 2016), XP002780171, Retrieved from the Internet <URL:https://de.wikipedia.org/wiki/Fraktionierte_Kristallisation_(Chemie)>.
2 pages in German language—Printed from Website.
1 page in English language—Printed from Website.
Van Dyke, Charles H., and Alan G. MacDiarmid. "The Reaction of 1, 2-Disilyldisiloxane, 1-Silyldisiloxane, and 1,1,1-Trimethyldisiloxane with Boron Trichloride." Inorganic Chemistry 3.5 (1964): 747-752 (p. 747).

* cited by examiner

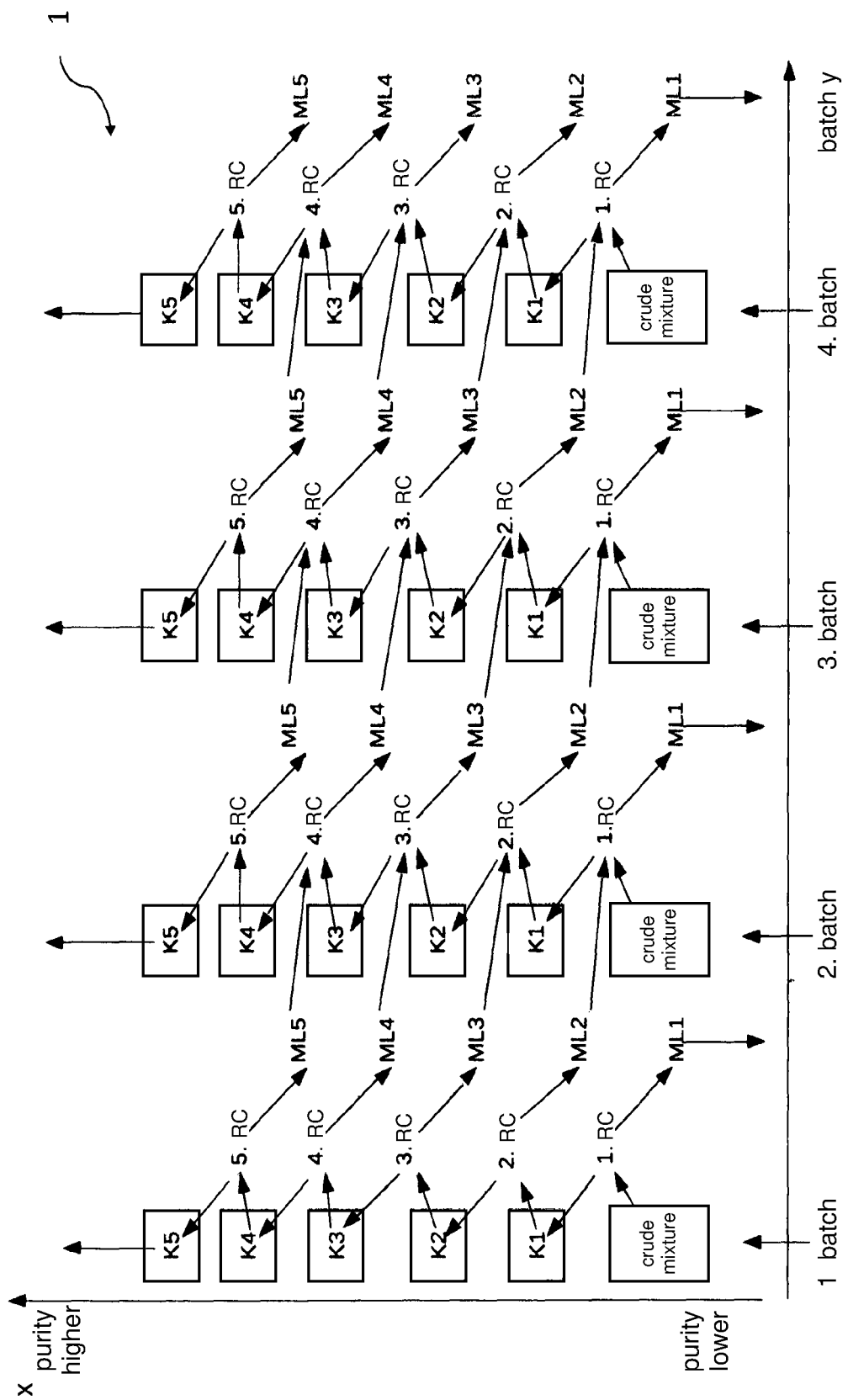

METHOD FOR INCREASING THE PURITY OF OLIGOSILANES AND OLIGOSILANE COMPOUNDS BY MEANS OF FRACTIONAL CRYSTALLIZATION

TECHNICAL FIELD

The invention relates to a method for increasing the purity of oligosilanes and oligosilane compounds, in particular inorganic oligosilanes, halogenated oligosilanes, or organic-substituted oligosilanes.

BACKGROUND

Impurities and contaminants of silicon compounds that are used in the semiconductor industry for microelectronic components lead to undesirable doping through which the functioning, for example, the signal transmission and heat generation, of the microelectronic components is disadvantageously affected. Methods for removing specific contaminations from halogenated silanes are already known from the prior art. Thus, DE 10 2009 027 729 A1 discloses a method for reducing the contaminations in silanes due to metallic or metalloid element compounds in which organic compounds are added to the respective silanes as scavenger reagents. Thus, scavenger reagents employ amino groups which can act as ligands to coordinate the metal centers or metalloid centers. Disadvantageously, this method cannot be used with oligosilanes, i.e., silanes with multiple silicon atoms up to ten silicon atoms, because the amino groups employed by the scavenger reagents can cause skeletal rearrangements in oligosilanes. Such skeletal rearrangements can favor the formation, on the one hand, of short-chain silanes such as for example silicon tetrachloride, and on the other hand, of long-chain branched silanes such as for example $(SiCl_3)_4Si$ which, however, are undesirable for further processing and/or can result in the complete decomposition of the desired products.

Van Dyke, et al., (Inorg. Chem., Vol. 3, No. 5, 1964 pp 747-752) describe the reaction of boron trichloride with various silyl siloxanes, wherein these are cleaved to silyl chlorides. This method relates, however, only to the removal of various siloxanes, wherein a reduction in dopant-containing compounds, such as for example boron compounds, phosphorus compounds, arsenic compounds, and antimony compounds, cannot be achieved.

A further method for decreasing impurities in silanes is known from DE 10 2014 013 250 A1, with which metallic or metalloid element impurities can be removed through the addition of fluorides and organic oligoethers or polyethers. This method is essentially envisioned for the removal of metallic impurities wherein the purification effect depends upon the reactivity of the impurities with the fluoride used. Disadvantageously, Lewis bases and Lewis acids cannot be removed equally well. Moreover, the addition of organic reagents can elicit undesirable side reactions, which requires that these reagents be removed.

SUMMARY

None of the methods known from the prior art enable the freeing of oligosilanes from impurities such as dopants, metallic compounds, and organic and inorganic molecular compounds without simultaneously having an essential effect on the desired products.

The object of the present invention is to propose a method that enables the decreasing of impurities in oligosilanes and the compounds thereof elicited by dopants, metallic compounds, and organic and inorganic molecular compounds whilst simultaneously being able to increase the purity of oligosilanes and the compounds thereof.

The object according to the invention is achieved through the method according to claim 1. Advantageous embodiments and developments of the invention can be realized with the features indicated in the dependent claims.

In the method according to the invention for increasing the purity of oligosilanes and/or oligosilane compounds, a first liquid substance mixture of at least 50% oligosilane compounds, comprising inorganic oligosilanes and/or halogenated oligosilanes and/or organic-substituted oligosilanes is provided, and the first liquid substance mixture undergoes at least one purification sequence, wherein in a first step a) the substance mixture is temperature-adjusted at a temperature at which at least one fraction of the oligosilane compounds solidifies, and in a second step b) at least one fraction of the liquid substance mixture is separated.

Preferably, solids formed in step a) can be completely separated from the liquid substance mixture in step b). The solids formed are predominantly crystals of the oligosilane compounds The crystals obtained can be re-liquefied through temperature adjustment, wherein the liquid obtained has a lower dopant concentration and/or a higher concentration or higher purity of the oligosilane compounds To further increase the purity of the crystals obtained, the purification sequence can be repeated with the liquefied crystals in a second purification sequence. In this way, the liquefied crystals that were used in a second purification sequence are referred to as a second liquid substance mixture. There is furthermore the possibility of conducting further purification sequences as third, fourth, and fifth purification sequences, wherein there is no limitation to the number of purification sequences conducted.

Advantageously, the method according to the invention makes use of the fact that with a lowering of the temperature pure oligosilanes which are liquid under normal conditions will, according to the thermodynamic distribution constants thereof, solidify or crystallize from impure oligosilane compounds or a impure oligosilane compound-containing liquid substance mixture, wherein impurities or impure compounds solidify or crystallize at lower temperatures due to freezing point depression. It is thus possible for pure oligosilanes to be separated as a solid at a temperature lower than that of the impurity-containing substance mixture, which can also be referred to as the mother liquor, without being treated with additional reagents, for example, such as solvents. With the method according to the invention, it is thus possible simultaneously to reduce dopants, metallic compounds, inorganic substances, and organic substances in a simple way without requiring a solvent or a heating of the liquid substance mixture. Through the method, oligosilanes for which the pollution with Al, Fe, or Cu is less than 100 ppb can be obtained.

For the preparation of the first liquid substance mixture, for example, waste products or side products from silicon manufacture can be used, such as for example from the Siemens process/Degussa process in which halogenated oligosilanes can be condensed out from the exhaust gases. Furthermore, halogenated oligosilanes or polysilanes can be obtained via targeted thermal or plasma chemical synthesis from simple monosilanes such as $SiCl_4$ or $HSiCl_3$, wherein a reducing agent such as $H_2$ can be used. Furthermore, oligosilanes arise as by-products in methods for the preparation of precursors in silicone production, such as the Müller-Rochow process, and can be isolated from the exhaust gases and used for the process according to the invention, that is to provide the first liquid substance mixture. Preferably, the liquid substance mixture provided for each purification sequence can be pre-distilled to obtain a fraction of at least 50% oligosilane compounds.

The crystal formation can be affected by stirring the crystallization batch, wherein it is advantageous to have the most laminar flow possible. With turbulence, discontinuous stirring, or non-uniform application of cooling, a fraction of a solid of matted crystals or smaller suspended crystals results to give a crystal slurry. Advantageously, pure crystals of oligosilanes can therefore be obtained by the method according to the invention as a suspension of crystals or as a compact crystal block.

For the purposes of the invention, oligosilanes are to be understood to be silanes formed with a maximum of nine silicon atoms, the desired product according to the invention being oligosilanes having the composition $Si_nX_{2n+2}$, $Si_nX_{2n}$, $Si_nX_{2n-2}$, $Si_nX_{2n-4}$, $Si_nX_{2n-6}$ with n=2 to n=9, wherein the substituents X independently of one another are halogen, hydrogen, or organic substituents. Expediently, the oligosilane compounds contained in the first and further liquid substance mixtures provided can be formed with a maximum of nine silicon atoms. In other words, a first liquid substance mixture or further liquid substance mixtures, which is/are at least 50% of oligosilane compounds formed with a maximum of nine silicon atoms, is/are preferably provided for further purification sequences.

Preferably, the purification sequence consisting of steps a) and b) can be repeated at least once to achieve increased purity of oligosilanes and/or increased concentration of the oligosilanes. In this way, further purification sequences are referred to as second, third, or fourth purification sequences. The substance mixture separated in step b) can also be referred to as mother liquor, wherein a liquid substance mixture separated off during the first purification sequence is referred to as a first mother liquor and a substance mixture separated off in the second purification sequence being referred to as a second mother liquor, and so on. Thus, it can be provided that at least one portion of the second separated liquid substance mixture, that is, one portion of the second mother liquor, is added to the first liquid substance mixture in a second purification sequence. This enables obtaining oligosilanes present in the second mother liquor in a further purification sequence, so that the yield of pure oligosilanes is increased. Expediently, in this way one uses a second mother liquor with a purity which is higher, however at least not significantly lower, than the purity of the first substance mixture provided. Before the addition to the further liquid substance mixture, the second mother liquor can be pre-distilled. By this pre-treatment, a concentration of oligosilane compounds contained can be achieved. Any further third or fourth mother liquors are not critical in the amounts thereof, but if adding again to a respective next batch should allow a meaningful utilization of the reactor volume without overfilling same.

According to one advantageous embodiment of the method according to the invention, it can be provided that in the at least one purification sequence in step b) at least 15% and at most 50% of the liquid substance mixture is separated. It can furthermore be provided that in at least one second or further purification sequence at least 10% and at most 80%, preferably 15% to 45% of the second or further liquid substance mixture is separated as the second or further mother liquor. Due to the volume of the reactor used for the method, the amount of the second or further mother liquor can limit the amount of the first, second, or further liquid substance mixture provided. It can therefore be provided that preferably 10% to 40% of the first, second or further mother liquor is added to the first, second, or further liquid substance mixture provided.

According to a further advantageous embodiment of the method according to the invention, it can be provided that the first, second, or further liquid substance mixture is temperature-adjusted for the preparation to obtain a dissolution or melting of the oligosilane compounds.

The crystallization of oligosilanes is achieved through temperature adjustment of the first, second, or further liquid substance mixture. Since the crystallization temperatures or the solidification temperatures of oligosilanes are affected by the type and amount of impurities, it can be provided that the required crystallization temperature is determined through observation of the substance mixture, wherein the temperature is lowered stepwise with temperature adjustment until crystals first form in the substance mixture The temperature reached can then be maintained for a predetermined period of time, preferably until the crystallization is complete or no significant increase in the crystal can be determined for a given period of time. Subsequently, the mother liquor obtained in each purification sequence, i.e., the remaining crystallized substance mixture, can be separated from the crystals formed. If the remaining mother liquor fulfills the conditions of the liquid substance mixture provided, that is consists of at least 50% of oligosilane compounds, it can be subjected directly to a further purification sequence. In this case, it is possible to set a lower temperature compared with the first purification sequence to obtain further crystals of further oligosilanes which crystallize or solidify at a lower temperature. If the separated liquid substance mixture does not consist of at least 50% oligosilane compounds or if the mother liquor does not meet the conditions of a liquid substance mixture, the mother liquor can be predistilled to achieve a concentration of oligosilane compounds.

According to one advantageous embodiment of the method according to the invention, it can be provided that during the temperature adjustment of the first, second, or further liquid substance mixture the temperature is varied below the temperature of an onset crystallization within a predetermined temperature range to achieve a percent degree of crystallization or percent degree of solidification of the liquid substance mixture. In this way, a crystallization of several further oligosilanes can be achieved. The percent degree of crystallization or percent degree of solidification is to be understood as a percentage of crystals formed in the respective liquid substance mixture. For example, during temperature adjustment the temperature can be reduced stepwise or a corresponding temperature maintained for a predetermined period of time until the proportion of crystals formed make up 50% of the liquid substance mixture. Conversely, the temperature adjustment or the crystallization of the liquid substance mixture can be maintained until a percentage of the original liquid substance mixture remains as the mother liquor.

According to an additional method step, it can further be advantageous for the temperature of the first, second, or further substance mixture to be kept above the crystallization temperature of the desired product for a predetermined period of time immediately before the crystals are separated. Through this additional method step, which can also be referred to as a thawing step, it is achieved that an undesired fraction, such as impure oligosilanes or dopants, which were detected in the crystallization or were present as adherent/included mother liquor in crystalline form, go back into solution and can be removed as mother liquor. Advantageously, the purity of the oligosilanes can be increased by a thawing step.

Preferably, the solids formed in step a) can be separated from the liquid substance mixture by decantation, filtration and/or centrifugation. According to a further advantageous embodiment variant of the method according to the invention, it can be provided that as a further process step after separation of the crystals, a distillation of the crystals is carried out at a pressure of less than 1600 hPa, preferably at a pressure of less than 800 hPa, more preferably in vacuo. Advantageously, contained suspended matter in particular can be removed from the oligosilanes by the distillation step.

To provide the liquid substance mixture, it can be provided according to a further embodiment that in addition to a temperature adjustment, the oligosilane compounds are mixed in a solvent which preferably has a lower solidification temperature than at least one inorganic oligosilane and/or halogenated oligosilane and/or organically substituted oligosilane. The solvent can be selected from a group comprising alkanes, chloroalkanes, especially dichloromethane, cycloalkanes, triglyme, diglyme, dioxane, dibutyl ether, tetrahydrofuran, diethyl ether, silanes or oligosilanes. Preferably, at least 0.01 mass % of the solvent can be used. The solvent used can be removed from the crystals formed by a subsequent distillation step.

According to a further advantageous embodiment of the method according to the invention, to initiate the crystallization process, the first, second, or further liquid substance mixture can be inoculated during the temperature adjustment with a seed crystal of an inorganic oligosilane and/or halogenated oligosilane and/or organically substituted oligosilane.

Preferably, the liquid substance mixture is stirred or pumped during the temperature adjustment to promote crystal formation.

A subsequent introduction of impurities can be prevented by carrying out the process according to the invention, in particular the purification sequence, in a closed reactor system. In this case, an inert gas can be used in the reactor to minimize undesired reactions. Accordingly, it can be provided that the method according to the invention is carried out under inert gas. Furthermore, when separating the crystals from the mother liquor thereof, an overpressure of inert gas can be used to minimize the introduction of impurities into the reactor.

Advantageously, the process according to the invention purifies products which are liquid under normal conditions. However, products which are solid in the pure state can also be obtained from the liquid substance mixtures. Preferably, the process can be applied to individual liquid oligosilane compounds which already have a relatively high purity, for example >99%, whereby after the process according to the invention the individual oligosilane compounds can be readily used for most applications. The advantage of the process according to the invention furthermore lies in the fact that costs can be saved and the product purity can be increased in comparison to the distillative separation methods used in the prior art.

The invention will be explained in more detail by way of example with reference to the following exemplary embodiments.

First exemplary embodiment for increasing the purity of hexachlorodisilane by the method according to the invention The first liquid substance mixture provided for the first embodiment contained 81.88% hexachlorodisilane (HCDS), 8.42% hexachlorodisiloxane, 8.44% pentachlorodisilane, and 1.13% tetrachlorosilane, and had a mass of 1422.5 g. For the purification of the hexachlorodisilane contained in the first liquid substance mixture, in the first purification sequence the first liquid substance mixture was taken into a reactor under stirring at 600-1000 revolutions per minute (rpm) using a stirring apparatus with temperature adjustment to a temperature of −40° C. to −48° C. The temperature adjustment process was terminated after 2 h. A crystal layer had formed on the reactor wall. The remaining first liquid substance mixture was withdrawn as the first mother liquor using a D3 pore size filter frit and was thus separated from the crystals. Subsequently, a second purification sequence took place wherein the crystals obtained from the first purification sequence were melted by temperature adjustment and the resulting liquid was taken into the reactor as a second liquid substance mixture under stirring at 600-1000 rpm using a stirring apparatus with temperature adjustment to a temperature of −40° C. to −48° C. for 2 h. The remaining second liquid substance mixture was withdrawn as a second mother liquor using a D3 pore size filter frit and was thus separated from the crystals.

The progress of the process was monitored by gas chromatography. For this purpose, the following GC analysis results were obtained from the first liquid substance mixture and from the crystals formed, in each case after the melting of the crystals after the first and the second purification sequence:

TABLE 1

| Content of: | First liquid substance mixture | After first purification sequence | After second purification sequence |
| --- | --- | --- | --- |
| Tetrachlorosilane | 1.13% | 0.39% | 0.10% |
| Pentachlorodisilane | 8.44% | 3.09% | 0.99% |
| Hexachlorodisiloxane | 8.42% | 3.41% | 0.64% |
| Hexachlorodisilane | 81.88% | 93.07% | 98.27% |

As can be seen from Table 1, an increase in the HCDS concentration to 98.27% was achieved after the second purification sequence.

Second exemplary embodiment for increasing the purity of hexachlorodisilane by the method according to the invention The first liquid substance mixture provided for the second embodiment contained 99.898% hexachlorodisilane (HCDS), 0.097% hexachlorodisiloxane, and 0.005% tetrachlorosilane, and had a mass of 1303.5 g. For the purification of the hexachlorodisilane contained in the first liquid substance mixture, in the first purification sequence the first liquid substance mixture was taken into the reactor under stirring at 300-400 rpm using a stirring apparatus with temperature adjustment to a temperature of −6° C. The temperature adjustment process was terminated after one hour. A crystal layer had formed on the reactor wall. The remaining first liquid substance mixture was withdrawn as the first mother liquor using a D3 pore size filter frit and was thus separated from the crystals. Subsequently, a second, third, and fourth purification sequence took place analogously to the first purification sequence. Thus, the crystals obtained after each purification sequence were liquefied by temperature adjustment for the subsequent purification step and used in each case as a liquid substance mixture.

After the fourth purification step, 119.65 g of purified HCDS with a purity of >99.99% could be obtained, as shown in Table 2. The progress of the process was monitored by gas chromatography. For this purpose, the following GC analysis results were obtained from the first liquid substance mixture and from the crystals formed, in each case after the melting of the crystals after the first, second, third, and fourth purification sequence:

TABLE 2

| Content of: | First liquid substance mixture | After first purification sequence | After second purification sequence | After third purification sequence |
|---|---|---|---|---|
| Tetrachlorosilane | 0.005% | 0.003% | 0.002% | <0.001% |
| Hexachlorodisiloxane | 0.097% | 0.013% | 0.008% | <0.001% |
| Hexachlorodisilane | 99.898% | 99.98% | 99.989% | >99.99% |

Third exemplary embodiment for increasing the purity of hexachlorodisilane by the method according to the invention To increase the purity of hexachlorodisilane, in the third exemplary embodiment the purification sequences were continuously performed using a fraction of a mother liquor from a preceding purification sequence in a subsequent purification sequence. The exemplary embodiment illustrates the method according to the invention with five purification sequences in an ongoing continuous process. First, a first liquid substance mixture is provided which has a mass of 47.505 kg and an HCDS concentration of 99.304%, as can be seen from the first column of Table 3 below. During the first purification sequence, 23.8 kg of a second mother liquor of a preceding batch is added to the first liquid substance mixture provided in a reactor and the temperature was then adjusted to −20° C. under stirring with a stirring apparatus at 350 rpm. The temperature adjustment process was terminated after 6 hours and 52 minutes. The essential fraction of the crystals formed was grown as a compact hollow cylinder on the reactor inner wall. Subsequently, 27.5 kg of the first mother liquor was withdrawn via a bottom drain valve from the reactor and the crystals formed melted at 35° C. During the melting, 21.115 kg of a third mother liquor was added to the previous batch so that the second liquid substance mixture formed had a mass of 64.92 kg. The second liquid substance mixture thus formed underwent a second purification sequence, wherein said sequence proceeded as described above. After 5 hours and 50 minutes, 28.225 kg was separated as the second mother liquor, and the crystallisate melted at 35° C. while 15.53 kg of a fourth mother liquor from the previous batch was added to provide a third liquid substance mixture having a mass of 52.225 kg for a third purification sequence.

During the third purification sequence, the third liquid substance mixture was temperature adjusted to a temperature of −20° C. under stirring using a stirring apparatus at 350 rpm. 31.995 kg of crystals was obtained after 7 hours and 12 minutes, wherein 20.23 kg was separated as the third mother liquor. The crystallisate was melted at 35° C. while 7.795 kg of a fifth mother liquor was added to the previous batch to provide a fourth liquid substance mixture having a mass of 39.79 kg for a fourth purification sequence.

During the fourth purification sequence, the fourth liquid substance mixture was temperature adjusted to a temperature of −20° C. under stirring using a stirring apparatus at 350 rpm. After 6 hours and 10 minutes, 14.49 kg was separated as the fourth mother liquor and 25.3 kg of crystals was obtained. The crystallisate was melted at 35° C. and used as the fifth liquid substance mixture for a fifth purification sequence, with no additional mother liquor from a previous batch being added to achieve a maximum purity.

During the fifth purification sequence, the fifth liquid substance mixture was temperature adjusted to a temperature of −20° C. under stirring using a stirring apparatus at 350 rpm. The temperature adjustment was terminated after 6 hours and 58 minutes. Subsequently, 5.84 kg of liquid was separated off as the fifth mother liquor, so that 19.46 kg of HCDS crystallisate with a purity of >99.99% was obtained.

The process progress was monitored by gas chromatography. For this purpose, the following GC analysis results were obtained from the first liquid substance mixture and from the end product after the fifth purification sequence:

TABLE 3

| Content of: | Liquid substance mixture | after fifth purification sequence |
|---|---|---|
| Tetrachlorosilane | 0.096% | <0.001% |
| Pentachlorodisilane | 0.03% | <0.001% |
| Hexachlorodisiloxane | 0.56% | 0.007% |
| Hexachlorodisilane | 99.304% | >99.99% |

The method according to the invention will be explained in more detail by way of example in a figure in the following exemplary embodiment.

BRIEF DESCRIPTION OF THE DRAWING

FIG. 1: A flowchart of an exemplary embodiment of the method according to the invention for increasing the purity of oligosilanes and/or oligosilane compounds

DETAILED DESCRIPTION

FIG. 1 shows a flowchart of an exemplary embodiment of the method according to the invention for increasing the purity of oligosilanes and/or oligosilane compounds. According to the exemplary embodiment shown, the process according to the invention can be carried out in batches, wherein, mother liquors ML2 to ML5 separated from a first batch in a purification sequence are added in each case to the liquid substance mixture in the subsequent batch. The first substance mixture is referred to in the present example as a crude mixture. Four batches are shown on the X-axis of Chart A, wherein the number of purification sequences from the $1^{st}$ RC to $5^{th}$ RC is shown in the direction of the Y-axis. The reference numerals K1 to K5 denote the crystallisates obtained for each of batches 1 to 4, the purity of which increases with a consecutive number.

According to the exemplary embodiment, each of batches 1 to 4 starts with a raw mixture as the first liquid substance mixture, which is respectively supplied to the first purification sequence $1^{st}$ RC. From the second batch 2, at least a fraction of second mother liquor ML2 from the preceding first batch 1 is blended into the first purification sequence $1^{st}$ RC and is co-processed. The first purification sequence $1^{st}$ RC supplies the first crystallisate K1, which has higher purity than the crude mixture, and the mother liquor ML1, which has a lower purity. The fractions of the first mother liquors ML1 are discharged and treated separately to achieve a purity which corresponds at least to that of the raw mixture. For a second purification sequence $2^{nd}$ RC, the first crystallisate K1 is merged with at least one fraction of a third mother liquor ML3 from a previous batch. The crystallisate K2 and the second mother liquor ML2 arise from the second purification sequence $2^{nd}$ RC. The crystallisate K2 is combined with at least one fraction of the mother liquor ML4 from a preceding batch for a third purification sequence $3^{rd}$ RC. The crystallisate K3 and the third mother liquor ML3 arise from the third purification sequence $3^{rd}$ RC. The crystallisate K3 is combined with at least one fraction of the mother liquor ML5 from a preceding batch for a fourth purification sequence $4^{th}$ RC. After the fifth purification sequence $5^{th}$ RC, the purity of the product is high enough for sale, so the process can be terminated at this point. One skilled in the art will realize that, without departing from the essence of the process according to the invention, fewer or more purification sequences RC can be carried out

The invention claimed is:

1. A method for purifying oligosilane compounds, comprising:
    providing a liquid substance crude mixture with a concentration of at least 50% oligosilane compounds, wherein the liquid substance crude mixture comprises comprising inorganic oligosilanes and/or halogenated oligosilanes and/or organic-substituted oligosilanes;
    adjusting, in a first purification sequence, the temperature of a portion of the liquid substance crude mixture to a temperature at which a fraction of the oligosilane compounds solidifies
    and completely separating the solidified fraction from the remaining liquid substance crude mixture, whereby at least 15 mass % and at most 50 mass % of the liquid substance mixture is obtained as a first mother liquor;
    re-liquifying, in a second purification sequence, the solidified fraction to form a second liquid substance mixture;
    adjusting, in the second purification sequence, the temperature of the second liquid substance mixture to a temperature at which a further fraction of the oligosilane compounds solidifies,
    completely separating the solidified further fraction from the remaining second liquid substance mixture, whereby a second mother liquor is obtained and
    wherein 15 mass % to 45 mass % of the second liquid substance mixture is separated as the second mother liquor,
    combining, in a further purification sequence, at least a fraction of the first second mother liquor with another portion of the crude mixture to obtain a combined mixture,
    adjusting the temperature of the combined mixture to a temperature at which a third fraction of the oligosilane compounds solidifies; and
    completely separating the solidified third fraction from the remaining combined mixture,
    wherein at least one of the purification sequences is carried out in a closed reactor system under an inert gas.

2. The method according to claim 1, wherein the liquid substance mixture is pre-distilled to achieve the concentration of at least 50% oligosilane compounds.

3. The method according to claim 1, wherein completely separating the solidified fraction from the remaining liquid substance crude mixture and completely separating the solidified further fraction from the remaining second liquid substance mixture are performed by decantation, filtration, and/or centrifugation.

4. The method according to claim 1, wherein the temperature is decreased during the temperature adjustment until a crystallization begins and this temperature is then held for a pre-determined time period.

5. The method according to claim 1, wherein during the temperature adjustment the liquid substance mixture is agitated.

* * * * *